United States Patent
Kawakami et al.

(10) Patent No.: US 12,421,583 B2
(45) Date of Patent: Sep. 23, 2025

(54) STEEL SHEET FOR HOT-DIP GALVANIZING, HOT-DIP GALVANIZED STEEL SHEET, AND ALLOYED HOT-DIP GALVANNEALED STEEL SHEET

(71) Applicant: Kobe Steel, Ltd., Kobe (JP)

(72) Inventors: Akira Kawakami, Kakogawa (JP); Hiroo Shige, Kakogawa (JP); Hiroshi Irie, Kakogawa (JP); Takayuki Maeda, Kakogawa (JP); Hang Yu, Fujisawa (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 102 days.

(21) Appl. No.: 18/548,114

(22) PCT Filed: Mar. 2, 2022

(86) PCT No.: PCT/JP2022/008966
§ 371 (c)(1),
(2) Date: Aug. 28, 2023

(87) PCT Pub. No.: WO2022/191009
PCT Pub. Date: Sep. 15, 2022

(65) Prior Publication Data
US 2024/0141464 A1    May 2, 2024

(30) Foreign Application Priority Data

Mar. 8, 2021  (JP) ................................. 2021-036227
Feb. 1, 2022  (JP) ................................. 2022-014413

(51) Int. Cl.
*C22C 38/04*   (2006.01)
*C21D 8/02*    (2006.01)
(Continued)

(52) U.S. Cl.
CPC ............ *C22C 38/04* (2013.01); *C21D 8/0205* (2013.01); *C21D 9/46* (2013.01); *C22C 38/02* (2013.01);
(Continued)

(58) Field of Classification Search
CPC ....... C23C 2/0222; C23C 2/0224; C23C 2/06; C23C 2/40; C21D 9/46; C22C 38/04; C22C 38/02
(Continued)

(56) References Cited

U.S. PATENT DOCUMENTS 6,398,884 B1     6/2002  Kyono et al.
2010/0304183 A1  12/2010 Honda et al.
(Continued)

FOREIGN PATENT DOCUMENTS

JP    5-239553 A     9/1993
JP    2002-155317 A  5/2002
(Continued)

OTHER PUBLICATIONS

International Search Report issued May 24, 2022 in PCT/JP2022/008966, filed on Mar. 2, 2022, 2 pages.
(Continued)

*Primary Examiner* — Katherine A Christy
(74) *Attorney, Agent, or Firm* — Oblon, McClelland, Maier &Neustadt, L.L.P.

(57) ABSTRACT

A steel sheet may be used for hot-dip galvanizing capable of manufacturing hot-dip galvannealed steel sheet(s) with a high Si content and in which alloying unevenness is suppressed. Such a steel sheet for hot-dip galvanizing may include an internal oxide layer containing an oxide of Si between a surface layer of the steel sheet and a steel sheet base portion. The Si content in a chemical composition of the steel sheet may be 1.0 mass % or more. A solid solution (Continued)

Si amount from a surface of the steel sheet to a depth of 1 μm measured at all four positions including positions of 10 mm, 30 mm, and 50 mm from an edge in a coil width direction and a position of a center in the coil width direction at a rear end in a rolling direction of the steel sheet for hot-dip galvanizing may be 1.4 wt. % or less.

20 Claims, 3 Drawing Sheets

(51) Int. Cl.
*C21D 9/46* (2006.01)
*C22C 38/02* (2006.01)
*C23C 2/02* (2006.01)
*C23C 2/06* (2006.01)
*C23C 2/40* (2006.01)

(52) U.S. Cl.
CPC .......... *C23C 2/0222* (2022.08); *C23C 2/0224* (2022.08); *C23C 2/06* (2013.01); *C23C 2/40* (2013.01)

(58) Field of Classification Search
USPC ........................................................ 428/659
See application file for complete search history.

(56) References Cited

U.S. PATENT DOCUMENTS

| | | |
|---|---|---|
| 2017/0253943 A1 | 9/2017 | Makimizu et al. |
| 2019/0233910 A1 | 8/2019 | Ryu et al. |
| 2022/0056564 A1* | 2/2022 | Kang .................. C21D 8/0205 |

FOREIGN PATENT DOCUMENTS

| | | |
|---|---|---|
| JP | 2010-116590 A | 5/2010 |
| JP | 2016-180140 A | 10/2016 |
| KR | 10-2018-0043331 A | 4/2018 |
| WO | WO 2019/121793 A1 | 6/2019 |

OTHER PUBLICATIONS

Extended European Search Report issued Jul. 10, 2024 in European Application No. 22766968.6, 8 pgs.
International Preliminary Report on Patentability and Written Opinion issued on Sep. 21, 2023 in PCT/JP2022/008966, 6 pages.

* cited by examiner

STEEL SHEET FOR HOT-DIP GALVANIZING, HOT-DIP GALVANIZED STEEL SHEET, AND ALLOYED HOT-DIP GALVANNEALED STEEL SHEET

CROSS-REFERENCE TO RELATED APPLICATIONS

The present application is the national stage of international application PCT/JP2022/008966, filed on Mar. 2, 2022, and claims the benefit of the filing date of Japanese Appl. No. 2021-036227, filed on Mar. 8, 2021, and Japanese Appl. No. 2022-014413, filed on Feb. 1, 2022.

TECHNICAL FIELD

The present invention relates to a high-strength and high-formability steel sheet for hot-dip galvanizing and a hot-dip galvanized steel sheet and a hot-dip galvannealed steel sheet using the steel sheet for hot-dip galvanizing as a substrate, having a high Si content.

BACKGROUND ART

In the automobile industry, weight reduction and strength enhancement of an automobile member such as an automobile body are required from the viewpoint of improving fuel efficiency for reducing $CO_2$ and improving crashworthiness. Thus, an ultra-high-strength steel sheet having a tensile strength of 980 MPa or more is applied to the automobile member such as the automobile body. In order to improve the formability of such a high-strength steel sheet, a method is known in which inexpensive Si is contained in a chemical composition of the steel sheet. When Si is contained in the chemical composition of the steel sheet, not only the strength but also the formability of the steel sheet can be improved.

In general, when Si-added steel is applied to the automobile member, a hot-dip galvanized steel sheet (GI steel sheet) and a hot-dip galvannealed steel sheet (GA steel sheet) obtained by alloying the hot-dip galvanized steel sheet are used from the viewpoint of securing corrosion resistance and weldability. However, in the hot-dip galvanized steel sheet in which Si is added to the steel sheet, since an Si oxide layer covers a steel sheet surface in the manufacturing process, problems such as bare spot, reduction in plating adhesion, and an alloying unevenness in alloying treatment are likely to occur finally. In addition, problems such as peeling of the plating during processing of the hot-dip galvannealed steel sheet may also occur. In order to suppress such a problem caused by the addition of Si, the hot-dip galvanized steel sheet containing Si in a steel raw material is often manufactured using an oxidation-reduction method using an annealing furnace having an oxidation heating zone and a reduction heating zone. According to the oxidation-reduction method, since iron oxide generated in the oxidation heating zone generates a reduced Fe layer during reduction annealing, plating wettability during plating can be improved. In addition, a method of forming an internal oxide layer containing $SiO_2$ and the like necessary for plating in advance in a steel sheet by increasing a coiling temperature in hot rolling is also used.

In recent years, in order to further improve the strength and formability of the hot-dip galvanized steel sheet, various developments have been made on a method of favorably forming a hot-dip galvanized steel sheet or an internal oxide layer in which an Si content of the steel sheet is increased to 1 mass % or more.

Specifically, for example, Patent Literature 1 describes a high-strength hot-dip galvannealed steel sheet with a good appearance containing Fe on a high-strength steel sheet containing C: 0.05 to 0.25%, Si: 0.3 to 2.5%, Mn: 1.5 to 2.8%, P: 0.03% or less, S: 0.02% or less, Al: 0.005 to 0.5%, and N: 0.0060% or less in terms of mass %, with the balance being Fe and unavoidable impurities, and having a hot-dip galvannealed layer containing Zn and unavoidable impurities as the balance, in which an oxide containing Si at a crystal grain boundary on a steel sheet side of 5 μm or less from an interface between a high-strength steel sheet and a plating layer and within the crystal grains is present at an average content of 0.6 to 10 mass %, and an oxide containing Si is present in the plating layer at an average content of 0.05 to 1.5 mass %.

In addition, for example, Patent Literature 2 describes a method for manufacturing a high-strength hot-dip galvanized steel sheet having excellent plating adhesion, formability, and appearance, and this method includes a hot rolling step of hot rolling a slab containing C: 0.05 to 0.30%, Si: 0.1 to 2.0%, and Mn: 1.0 to 4.0% in terms of mass %, then coiling the steel sheet into a coil at a specific temperature Tc, and pickling the steel sheet, a cold rolling step of cold rolling the hot-rolled steel sheet resulting from the hot rolling step, an annealing step of annealing the cold-rolled steel sheet resulting from the cold rolling step under specific conditions, and a hot-dip galvanizing step of hot-dip galvanizing the annealed sheet resulting from the annealing step in a hot-dip galvanizing bath containing 0.12 to 0.22 mass % Al.

In addition, for example, Patent Literature 3 describes a cold-rolled steel sheet obtained by heat-treating a raw steel piece in a temperature range of 650 to 950° C. in an atmosphere in which reduction does not substantially occur after hot rolling while keeping adhesion of a black scale, thereby forming an internal oxide layer on a surface portion of a base steel sheet of the steel sheet, and then performing pickling, cold rolling, and recrystallization annealing according to a conventional method.

CITATION LIST

Patent Literature

Patent Literature 1: JP 2006-233333 A
Patent Literature 2: WO 2016/038801 A
Patent Literature 3: JP 2000-309824 A

SUMMARY OF INVENTION

An object of the present invention is to provide a steel sheet for hot-dip galvanizing capable of manufacturing a hot-dip galvannealed steel sheet which has a high Si content and in which alloying unevenness is suppressed.

As a result of intensive studies to solve the above problems, the present inventors have accomplished the present invention.

That is, a steel sheet for hot-dip galvanizing according to a first aspect of the present invention includes an internal oxide layer containing an oxide of Si between a surface layer of the steel sheet and a steel sheet base portion, in which an Si content in a chemical composition of the steel sheet is 1.0 mass % or more, and a solid solution Si amount from a surface of the steel sheet to a depth of 1 μm measured at all four positions including positions of 10 mm, 30 mm, and 50 mm from an edge in a coil width direction and a position of a center in the coil width direction at a rear end in a rolling direction of the steel sheet for hot-dip galvanizing is 1.4 wt % or less.

A hot-dip galvanized steel sheet according to a second aspect of the present invention includes a Zn-plated layer on a surface of the steel sheet for hot-dip galvanizing according to the first aspect.

A hot-dip galvannealed steel sheet according to a third aspect of the present invention includes an alloyed Zn-plated layer on a surface of the steel sheet for hot-dip galvanizing according to the first aspect.

DESCRIPTION OF EMBODIMENTS

As described above, the techniques described in Patent Literatures 1 to 3 relate to a method for manufacturing a hot-dip galvanized steel sheet or the like in which an Si content of a steel sheet is increased to 1 mass % or more, and a method for forming an internal oxide layer well.

However, when the Si content is increased to 1 mass % or more in order to obtain a high-strength and high-formability hot-dip galvanized steel sheet having a tensile strength of 980 MPa or more, it is difficult to obtain a hot-dip galvannealed steel sheet uniformly alloyed over the entire surface of a coil only by applying the conventional manufacturing method. In particular, as compared with the vicinity of a center in a coil width direction of the steel sheet (hereinafter, also simply referred to as "width direction center"), it is difficult for the galvanizing to be uniformly alloyed in the vicinity of an edge of the steel sheet in the coil width direction (hereinafter, also simply referred to as "width direction edge").

Specifically, in the case of using high Si-added steel, when the coil is cooled after coiling in hot rolling, the coil is steeply cooled in the vicinity of the width direction edge of the steel sheet. Thus, in the vicinity of the width direction edge of the steel sheet, the internal oxide layer hardly grows, and a layer is formed thin. On the other hand, in the vicinity of the width direction center of the steel sheet, the internal oxide layer sufficiently grows, and a layer is formed thick. In addition, in the subsequent pickling step, the internal oxide layer in the vicinity of the width direction edge of the steel sheet preferentially dissolves. As described above, the thickness of the internal oxide layer is different in the coil width direction, which causes alloying unevenness.

Such a problem cannot be solved even by using the techniques described in the above-described Patent Literatures. For example, even in the method for manufacturing a steel sheet described in Patent Literature 1, the rapid cooling of the coil in the vicinity of the width direction edge is not taken into consideration, so that the internal oxide layer cannot remain in the vicinity of the width direction edge of the steel sheet. In the manufacturing method described in Patent Literature 2, since it is necessary to lower a coiling temperature as the contents of Si and Mn increase, it is difficult to generate a predetermined amount of oxide in the vicinity of the width direction edge. As a result, it is difficult to uniformly manufacture a hot-dip galvannealed steel sheet having no alloying unevenness in the width direction of the steel sheet even by using the techniques disclosed in Patent Literatures 1 and 2. On the other hand, according to the manufacturing method in Patent Literature 3, since the temperature of the heat treatment is high, a reduced Fe layer covering the surface cannot be removed by pickling. As a result, contamination of the steel sheet and decarburization in the vicinity of the surface of the steel sheet proceed, and thus it becomes difficult to obtain a steel sheet having a predetermined strength, for example, a tensile strength as high as 980 MPa.

Thus, the present inventors have conducted various studies on a substrate capable of manufacturing a hot-dip galvannealed steel sheet in which alloying unevenness is suppressed even when the Si content is large, specifically, a steel sheet for hot-dip galvanizing. The present inventors have completed the present invention by focusing on suppression of surface concentration of Si and remaining of the internal oxide layer in the vicinity of the width direction edge in a steel sheet for hot-dip galvanizing. Specifically, a steel sheet for hot-dip galvanizing according to the present invention includes an internal oxide layer containing an oxide of Si between a surface layer of the steel sheet and a steel sheet base portion, an Si content in a chemical composition of the steel sheet is 1.0 mass % or more, and a solid solution Si amount from a surface of the steel sheet to a depth of 1 µm measured at all four positions including positions of 10 mm, 30 mm, and 50 mm from an edge in a coil width direction and a position of a center in the coil width direction at a rear end in a rolling direction of the steel sheet for hot-dip galvanizing is 1.4 wt % or less. According to the configuration of such a steel sheet for hot-dip galvanizing, it has been found that a high-strength and high-formability hot-dip galvannealed steel sheet in which alloying unevenness is suppressed can be obtained. The hot-dip galvannealed steel sheet thus obtained may have a tensile strength of, for example, 980 MPa or more.

That is, according to the present invention, it is possible to provide a steel sheet for hot-dip galvanizing capable of manufacturing a hot-dip galvannealed steel sheet which has a high Si content and in which alloying unevenness is suppressed.

Hereinafter, an embodiment of the present invention will be described in detail. Note that, the scope of the present invention is not limited to the embodiment described herein, and various modifications can be made without departing from the spirit of the present invention.

In the present specification, unless a specific position is indicated, the "edge in the coil width direction (of the steel sheet)" or the "width direction edge" basically intends both edges in the coil width direction, that is, both ends in a sheet width direction. In addition, in the present specification, "the vicinity of the edge in the coil width direction (of the steel sheet)" or "the vicinity of the width direction edge" means a peripheral portion of the position of the edge in the coil width direction. When a specific position is indicated from the edge in the coil width direction, a distance from the width direction edge (in other words, the position of 0 mm in the width direction) is also described.

In the present specification, the "center in the coil width direction (of the steel sheet)" or the "width direction center" means the center of the steel sheet in the sheet width direction. In addition, in the present specification, "the vicinity of the center in the coil width direction (of the steel sheet)" or "the vicinity of the width direction center" means a peripheral portion of the position of the center in the coil width direction.

In the present specification, a "rear end in a rolling direction (of the steel sheet)" means a position of the rear end in a direction parallel to the rolling direction of the steel sheet for hot-dip galvanizing, that is, a position of a rearmost end of 0 mm. In addition, in the present specification, "the vicinity of the rear end in the rolling direction (of the steel sheet)" means a peripheral portion of a position of the rear end in the rolling direction.

In the present specification, a "front end in a rolling direction (of the steel sheet)" means a position of the front end in the direction parallel to the rolling direction of the steel sheet for hot-dip galvanizing, that is, a position of a frontmost end of 0 mm. In addition, in the present specification, "the vicinity of the front end in the rolling direction (of the steel sheet)" means a peripheral portion of a position of the front end in the rolling direction.

1. Configuration, Chemical Composition, and Characteristics of Steel Sheet (Substrate) for Hot-Dip Galvanizing The steel sheet for hot-dip galvanizing according to the present embodiment includes an internal oxide layer containing an oxide of Si between a surface layer of the steel sheet and a steel sheet base portion, an Si content in a chemical composition of the steel sheet is 1.0 mass % or more, and a solid solution Si amount from a surface of the steel sheet to a depth of 1 μm measured at all four positions including positions of 10 mm, 30 mm, and 50 mm from an edge in a coil width direction and a position of a center in the coil width direction at a rear end in a rolling direction of the steel sheet for hot-dip galvanizing is 1.4 wt % or less.

Figure 1:
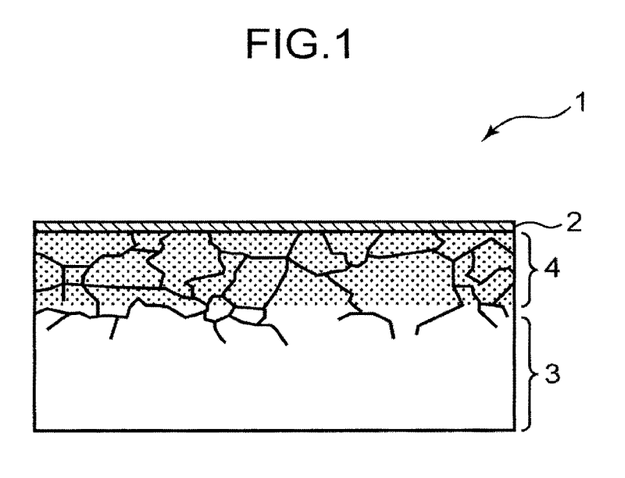
FIG. 1 is a schematic cross-sectional view of a steel sheet for hot-dip galvanizing according to the present embodiment.

The internal oxide layer in the present specification means an internal oxide layer containing $SiO_2$ (including oxidized portions of both grain boundary oxidation and intragranular oxidation) that can be generated inside the steel sheet during heating in hot rolling and annealing before pickling (in other words, "annealing after hot rolling and before annealing by an oxidation-reduction method (in the manufacturing of the hot-dip galvanized steel sheet and the hot-dip galvannealed steel sheet)", the same applies hereinafter). In addition, the steel sheet base portion in the present specification means an inner portion of the steel sheet that does not contain an oxide such as $SiO_2$ after being heated in hot rolling or annealing before pickling. FIG. 1 shows a schematic cross-sectional view of the steel sheet for hot-dip galvanizing according to the present embodiment. In FIG. 1, each reference sign represents a steel sheet 1 for hot-dip galvanizing, a surface layer 2 of the steel sheet, a steel sheet base portion 3, and an internal oxide layer 4. As shown in FIG. 1, the steel sheet 1 for hot-dip galvanizing has the internal oxide layer 4 between the surface layer 2 of the steel sheet and the steel sheet base portion 3. Such a configuration can be confirmed using a technique known to those skilled in the art, and for example, a portion where a thickness of the internal oxide layer 4 is large can be confirmed using a scanning electron microscope.

The chemical composition of the steel sheet for hot-dip galvanizing according to the present embodiment is not particularly limited as long as the Si content is 1.0 mass % or more, and will be described in more detail later.

In the present specification, the "solid solution Si amount (wt %) from the surface of the steel sheet to a depth of 1 μm" means an average value (wt %) of the solid solution Si amount from the surface of the steel sheet to a depth of 1 μm, which can be measured and calculated from the following (Formula 1) using a test piece of the steel sheet and a fully automatic scanning X-ray photoelectron spectrometer as described in detail in Examples below.

$$\text{Solid solution Si amount (wt \%)} = [Si(Si\text{---}Si, Fe\text{---}Si)/\{Si(SiO_x) + Si(Si\text{---}Si, Fe\text{---}Si)\}] \times Si \text{ content in steel} \quad \text{(Formula 1)}$$

In the present specification, the phrase "the solid solution Si amount from the surface of the steel sheet to a depth of 1 μm is 1.4 wt % or less" means that the solid solution Si amount (specifically, the average value of the solid solution Si amount) from the surface of the steel sheet to a depth of 1 μm, which is measured using a test piece including a specific position of the steel sheet, is 1.4 wt % or less. That is, as described in detail in Examples below, in the steel sheet for hot-dip galvanizing according to the present embodiment, the solid solution Si amount (specifically, the average value of the solid solution Si amount) from the surface of the steel sheet to a depth of 1 μm that is measured using four test pieces respectively including the positions of 10 mm, 30 mm, and 50 mm from the edge in the coil width direction and the position of the center in the coil width direction at the rear end in the rolling direction of the steel sheet is all 1.4 wt % or less. In addition, in the steel sheet for hot-dip galvanizing according to the present embodiment, the solid solution Si amount from the surface of the steel sheet to a depth of 1 μm which is measured using a test piece including a position of 70 mm from the edge in the coil width direction at the rear end in the rolling direction of the steel sheet is also preferably 1.4 wt % or less.

The value of the solid solution Si amount from the surface of the steel sheet to a depth of 1 μm in such a definition of the solid solution Si amount of the present embodiment is preferably 1.36 wt % or less, more preferably 1.32 wt % or less, and still more preferably 1.30 wt % or less. In addition, in the definition of the solid solution Si amount of the present embodiment, the lower limit value of the value of the solid solution Si amount from the surface of the steel sheet to a depth of 1 μm is not particularly limited, and may be a lower value. For example, the value of the solid solution Si amount measured using one or more of the four test pieces including the four positions described above, for example, the test piece including the position of the center in the coil width direction may be 0 wt %.

By satisfying the definition of the configuration, the definition of the chemical composition, and the definition of the characteristics of the steel sheet for hot-dip galvanizing according to the present embodiment as described above, the steel sheet for hot-dip galvanizing preferably has the internal oxide layer not only in the vicinity of the width direction center but also in the vicinity of the width direction edge of the steel sheet for hot-dip galvanizing (specifically, a position of 0 mm to 50 mm from the width direction edge at the position of the rear end (0 mm) in the rolling direction). That is, the steel sheet for hot-dip galvanizing according to the present embodiment includes the internal oxide layer containing an oxide of Si between the surface layer of the steel sheet and the steel sheet base portion preferably at the position of 0 mm to 50 mm from the width direction edge (more preferably, the position of 0 mm) at the rear end in the rolling direction of the steel sheet for hot-dip galvanizing. As described above, the steel sheet for hot-dip galvanizing according to the present embodiment has the internal oxide layer in the vicinity of the width direction edge where internal oxidation most hardly remains. Thus, by using the steel sheet for hot-dip galvanizing, it is possible to manufacture a high-strength and high-formability hot-dip galvannealed steel sheet in which alloying unevenness is suppressed.

The internal oxide layer hardly grows not only in the vicinity of the width direction edge of the steel sheet but also in the vicinity of the rear end in the rolling direction as compared with the vicinity of the front end in the rolling direction of the steel sheet, and finally, galvanization may be less likely to be uniformly alloyed. Therefore, the steel sheet for hot-dip galvanizing according to the present embodiment preferably has the internal oxide layer not only from the vicinity of the width direction center of the steel sheet to the vicinity of the width direction edge but also from the vicinity of the front end in the rolling direction to the vicinity of the rear end in the rolling direction of the steel sheet. Specifically, it is preferable that the internal oxide layer remains substantially without interruption up to the vicinity of the width direction edge of the steel sheet and the vicinity of the rear end in the rolling direction of the steel sheet. Since the internal oxide layer remains as described above, it is possible to alloy hot-dip galvanization more reliably and uniformly on the entire surface of the coil.

The steel sheet for hot-dip galvanizing that satisfies the definition of the configuration of the internal oxide layer and the solid solution Si amount in the present embodiment as described above can be manufactured by controlling each condition in a manufacturing step of the steel sheet. In particular, as described in detail later, the steel sheet for hot-dip galvanizing can be manufactured by suitably controlling the conditions of hot rolling (particularly the coiling temperature) at the time of manufacturing the steel sheet for hot-dip galvanizing, the annealing conditions before pickling, and the pickling conditions. In addition, in order to cause the internal oxide layer to remain in the vicinity of the width direction edge, an annealing step before pickling the steel sheet after hot rolling is important.

2. Method for Manufacturing Steel Sheet for Hot-Dip Galvanizing

The method for manufacturing a steel sheet for hot-dip galvanizing according to the present embodiment is not particularly limited as long as a steel raw material (steel or steel sheet) having an Si content of 1.0 mass % or more is used, and the finally manufactured steel sheet for hot-dip galvanizing satisfies the characteristics and configurations of the steel sheet for hot-dip galvanizing described above.

Hereinafter, an example of the method for manufacturing a steel sheet for hot-dip galvanizing according to the present embodiment will be described.

(Provision of Steel Raw Material for Rolling)

First, a steel raw material such as a slab for rolling having a chemical composition in which the Si content is 1.0 mass % or more is prepared. The chemical composition of the steel raw material will be described in detail later. The steel raw material such as a slab can be provided by any known method. Examples of a method for preparing the slab include a method in which steel having a chemical composition described later is produced, and the slab is prepared by ingot-making or continuous casting. If necessary, a cast material obtained by ingot-making or continuous casting may be subjected to blooming and billet-making to obtain a slab.

(Hot Rolling)

Next, hot rolling is performed using the obtained steel raw material such as a slab to obtain a hot-rolled steel sheet.

Although the hot rolling may be performed by a method under any known conditions, the coiling temperature is set to 500° C. to 700° C. By setting the coiling temperature to 500° C. or higher, the internal oxide layer can be sufficiently grown, and it becomes easy to secure the internal oxide layer in the vicinity of the width direction edge after the subsequent steps. The coiling temperature is preferably 520° C. or higher, and more preferably 530° C. or higher. By setting the coiling temperature to 700° C. or lower, it is possible to avoid that an amount of reduced iron generated by cooling after hot rolling increases, and removal by subsequent pickling becomes difficult. The coiling temperature is preferably 680° C. or lower, and more preferably 660° C. or lower.

Other conditions at the time of hot rolling are not particularly limited. For example, in the hot rolling, the slab before hot rolling may be soakingly retained at a temperature of 1000° C. to 1300° C. or lower according to a conventional method, a finish rolling temperature may be set to 800° C. or higher, and then the steel sheet may be coiled as a coiled steel sheet. In addition, the coiled hot-rolled steel sheet after hot rolling may be naturally cooled to normal temperature.

(Annealing)

In addition, the coiled steel sheet is annealed at a soaking temperature of 540° C. to 620° C. under a non-reducing atmosphere.

In the present specification, "under the non-reducing atmosphere" means under a gas atmosphere in which the surface of the steel sheet is not substantially reduced. Although not limited, for example, a gas atmosphere such as $N_2$-less than 1.0 vol % $H_2$, argon, or atmosphere is preferable.

By setting the soaking temperature during annealing to 540° C. or higher, the internal oxide layer can be grown well and remain to the vicinity of the width direction edge of the steel sheet. As a result, a hot-dip galvanized steel sheet that can be alloyed without unevenness can be obtained. In addition, it is more preferable that the internal oxide layer is grown well and remains not only from the vicinity of the width direction center of the steel sheet to the vicinity of the width direction edge but also from the vicinity of the front end in the rolling direction to the vicinity of the rear end in the rolling direction of the steel sheet. As a result, it is possible to obtain a hot-dip galvanized steel sheet that can be alloyed substantially uniformly and reliably without unevenness on substantially the entire surface of the steel sheet. It is difficult to sufficiently grow the internal oxide layer up to the vicinity of the width direction edge only by the heating at the time of coiling during the hot rolling described above. By setting the soaking temperature during annealing to 620° C. or lower, it is possible to avoid that removal of scale by subsequent pickling becomes difficult. The soaking temperature during annealing is more preferably 550° C. or higher. Furthermore, the soaking temperature during annealing is more preferably 610° C. or lower.

The soaking time during annealing is not particularly limited, and may be controlled to a suitable time for obtaining a desired internal oxide layer in consideration of the conditions of hot rolling (particularly the coiling temperature), the soaking temperature in this step, and the pickling conditions in the subsequent step. For example, by ensuring 30 hours or more as the soaking time during annealing, a plated substrate (steel sheet for hot-dip galvanizing according to the present embodiment) having a desired internal oxide layer can be obtained. The upper limit of the soaking time during annealing is not particularly limited, and for example, if the soaking time is not excessively longer than 30 hours, it is possible to prevent deterioration of productivity.

(Pickling)

The annealed steel sheet is then preferably pickled. The pickling method is not particularly limited, and any known method may be applied. For example, the scale may be removed by immersion using hydrochloric acid or the like.

The pickling is preferably performed while being adjusted so that the scale adhering to the steel sheet is removed and the steel sheet after pickling satisfies the definition of the solid solution Si amount in the present embodiment described above. Specifically, for example, by suitably controlling the type of pickling liquid (for example, hydrochloric acid liquid), the concentration of the pickling liquid, the temperature of the pickling liquid, and the pickling time in consideration of the conditions of hot rolling (particularly the coiling temperature) and the annealing conditions before pickling, the steel sheet after pickling can satisfy the definition of the solid solution Si amount in the present embodiment described above.

For example, a hydrochloric acid concentration may be set to preferably 3 mass % or more, and more preferably 5 mass % or more. The hydrochloric acid concentration may be set to, for example, preferably 20 mass % or less, and more preferably 15 mass % or less. In addition, for example, the temperature of the pickling liquid may be set to preferably 60° C. or higher, and more preferably 70° C. or higher. Furthermore, the temperature of the pickling liquid may be set to preferably 90° C. or lower, and more preferably 80° C. or lower. The pickling time may be appropriately adjusted according to the concentration and temperature of the pickling liquid so that the steel sheet after pickling satisfies the definition of the solid solution Si amount in the present embodiment described above.

(Cold Rolling)

In addition, the steel sheet after pickling may be cold-rolled. The cold rolling method is not particularly limited, and any known method may be applied. For example, in order to obtain a desired sheet thickness, a cold rolling ratio in the cold rolling can be set in a range of 10% to 70%. The sheet thickness of the steel sheet is not particularly limited.

When the step of cold rolling is included, the coiling temperature at the time of hot rolling, the annealing conditions before pickling, and the pickling conditions may be appropriately adjusted so that the steel sheet after cold rolling satisfies the definition of the solid solution Si amount in the present embodiment described above.

By including the steps as described above and optional steps, the steel sheet for hot-dip galvanizing according to the present embodiment can be manufactured.

3. Hot-Dip Galvanized Steel Sheet and Hot-Dip Galvannealed Steel Sheet

The hot-dip galvanized steel sheet according to the present embodiment includes a Zn-plated layer on a surface of the steel sheet for hot-dip galvanizing according to the above embodiment. A hot-dip galvannealed steel sheet according to a further embodiment includes an alloyed Zn-plated layer on the surface of the steel sheet for hot-dip galvanizing according to the above embodiment.

The hot-dip galvanized steel sheet and the hot-dip galvannealed steel sheet according to these embodiments can be manufactured using the steel sheet for hot-dip galvanizing as a substrate according to the above embodiment. Hereinafter, an example of the manufacturing method will be described.

(Oxidation Treatment and Reduction Treatment)

First, annealing by the oxidation-reduction method is applied to the surface of the steel sheet for hot-dip galvanizing according to the above embodiment. First, the surface of the steel sheet is subjected to an oxidation treatment to form an Fe oxide layer on the surface of the steel sheet. In addition, the Fe oxide layer is subjected to a reduction treatment (also referred to as "reduction annealing treatment" in the present specification) under a reducing atmosphere to form a reduced Fe layer. At this time, oxygen supplied from the Fe oxide layer by reduction oxidizes Si and Mn inside the steel sheet. That is, by applying annealing by such an oxidation-reduction method, the Fe oxide layer becomes a barrier layer, an oxide of Si can be kept inside the steel sheet, and an increase in a solid solution Si amount in the vicinity of the surface layer of the steel sheet can be suppressed. As a result, wettability to hot-dip galvanization can be improved, and finally the alloying unevenness can be more reliably reduced.

The oxidation treatment and the reduction treatment may be performed using any known single facility or a plurality of any known facilities. Preferably, equipment of a continuous galvanizing line (CGL) is used from the viewpoint of manufacturing efficiency, cost, and quality retention. By using the continuous galvanizing line, an oxidation treatment and a reduction treatment by the oxidation-reduction method, and a hot-dip galvanizing treatment and an alloying treatment described later can be continuously performed in a series of manufacturing lines. More specifically, the oxidation treatment and the reduction treatment by the oxidation-reduction method are more preferably performed using, for example, an annealing furnace in the continuous hot-dip galvanization line of a non-oxygen furnace (NOF) type or a direct fired furnace (DFF) type.

The oxidation treatment is preferably applied to the surface of the steel sheet at a heating temperature as the steel sheet temperature of 750° C. or lower, for example, in the oxidation heating zone in a NOF-type or DFF-type annealing furnace. When the steel sheet temperature is 750° C. or lower, a hot-dip galvanized steel sheet having good plating adhesion can be obtained.

The steel sheet temperature in the oxidation treatment is preferably 730° C. or lower, more preferably 720° C. or lower, and still more preferably 700° C. or lower. The lower limit of the steel sheet temperature in the oxidation treatment is not particularly limited, and may be a temperature at which the Fe oxide layer is formed on the surface of the steel sheet under a gas atmosphere described later. For example, the steel sheet temperature in the oxidation treatment is preferably 650° C. or higher, and more preferably 670° C. or higher.

A temperature rise time in the oxidation treatment is preferably 10 seconds or more, and more preferably 15 seconds or more. Furthermore, for example, the temperature rise time in the oxidation treatment is preferably 120 seconds or less, and more preferably 90 seconds or less.

The oxidation treatment is not particularly limited, and can be performed, for example, under a gas atmosphere containing $O_2$, $CO_2$, $N_2$, and $H_2O$. More specifically, the oxidation treatment can be performed in a combustion gas such as cokes oven gas (COG) or liquefied petroleum gas (LPG) in, for example, the NOF-type or DFF-type annealing furnace or the like under a gas atmosphere in which a concentration of unburned $O_2$ is controlled. The $O_2$ concentration is preferably controlled in a range of 100 ppm to 17,000 ppm. The $O_2$ concentration is more preferably controlled at 500 ppm or more, and still more preferably 2,000 ppm or more. Furthermore, the $O_2$ concentration is more preferably controlled at 15,000 ppm or less, and still more preferably 13,000 ppm or less.

The heating temperature (soaking temperature) of the steel sheet in the reduction annealing treatment is not particularly limited, and may be performed at a temperature at which the Fe oxide layer formed by the oxidation treatment becomes the reduced Fe layer. Specifically, reduction annealing is preferably performed at a soaking temperature of preferably an $Ac_3$ point or higher. The $Ac_3$ point can be calculated by the following formula (i) ("The Physical Metallurgy of Steels, Leslie", (published by Maruzen Co., Ltd., written by William C. Leslie, p. 273)). A symbol of each element enclosed by [ ] in the formula (i) denotes the content (mass %) of the element.

$$Ac_3(° C.)=910-203\times[C]^{1/2}-15.2\times[Ni]+44.7\times[Si]+104\times[V]+31.5\times[Mo]+13.1\times[W]-\{30\times[Mn]+11\times[Cr]+20\times[Cu]-700\times[P]-400\times[Al]-120\times[As]-400\times[Ti]\} \quad (i)$$

The heating time (soaking time) in the reduction treatment is not particularly limited, and may be appropriately adjusted so that the Fe oxide layer formed by the oxidation treatment becomes the reduced Fe layer. For example, the heating time in the reduction treatment is preferably 30 seconds or more, and more preferably 45 seconds or more. Furthermore, the heating time in the reduction treatment is preferably 600 seconds or less, and more preferably 500 seconds or less.

The reduction annealing treatment can be performed by any known treatment method, for example, in the reduction heating zone in the NOF-type or DFF-type annealing furnace. Specifically, the reduction annealing treatment can be performed by heating the surface of the steel sheet under a reducing atmosphere mainly containing $H_2$ gas and an inert gas such as $N_2$. When a mixed gas containing $H_2$ gas and an inert gas such as $N_2$ is used, for example, the $H_2$ gas can be contained in a proportion of 3 vol % to 25 vol %, and an inert gas such as $N_2$ can be contained as the balance.

(Hot-Dip Galvanizing Treatment)

In addition, a hot-dip galvanized steel sheet in the present embodiment can be manufactured by subjecting the steel sheet after the reduction treatment to a hot-dip galvanizing treatment to form a Zn-plated layer on the surface of the steel sheet.

The method of the hot-dip galvanizing treatment is not particularly limited, and any known method may be applied. For example, the Zn-plated layer can be formed on the surface of the steel sheet by immersing the steel sheet in a Zn-plating bath at a steel sheet temperature of about 400° C. to 500° C. In addition, the immersion time of the steel sheet in the Zn-plating bath may be adjusted according to a desired Zn-plating adhesion amount.

(Alloying Treatment)

The method for manufacturing a hot-dip galvannealed steel sheet according to the present embodiment further includes a step of alloying the Zn-plated layer formed on the hot-dip galvanized steel sheet obtained by the above-described method.

Specifically, by heating the hot-dip galvanized steel sheet at a predetermined alloying temperature, Fe atoms contained in the steel sheet diffuse into the Zn-plated layer, and the Zn-plated layer can be alloyed. The alloying method is not particularly limited, and any known method may be applied. For example, the alloying temperature is not particularly limited, and can be set to, for example, preferably 480° C. to 650° C. The heating time at the alloying temperature is also not particularly limited, and can be set to, for example, preferably 10 seconds to 40 seconds. In addition, the heating of the alloying can be, for example, under an air atmosphere.

4. Chemical Composition of Steel Raw Material

The chemical composition of the steel raw material, that is, the steel sheet for hot-dip galvanizing according to the present embodiment is not particularly limited except for Si. Hereinafter, an example of the chemical composition of the steel raw material will be described.

[Si: 1 Mass % or More]

Si is an inexpensive steel reinforcing element, and hardly affects the formability of the steel sheet. In addition, Si is an element capable of suppressing generation of carbide due to decomposition of retained austenite useful for improving the formability of the steel sheet. In order to allow such an effect to be effectively exhibited, the Si content is 1.0 mass % or more, preferably 1.1 mass % or more, and more preferably 1.2 mass % or more. The upper limit of the Si content is not particularly limited, and when the Si content is too large, there is a possibility that solid-solution strengthening action by Si becomes remarkable and a rolling load increases, and there is a possibility that Si scale is generated during hot rolling to cause surface defects of the steel sheet. Thus, for example, the Si content is preferably 3.0 mass % or less, more preferably 2.7 mass % or less, and still more preferably 2.5 mass % or less from the viewpoint of manufacturing stability.

[Mn: Preferably 1.5 Mass % or More and 3.0 Mass % or Less]

Mn is also an inexpensive steel reinforcing element, similarly to Si, and is effective for improving the strength of the steel sheet. Mn is a particularly effective reinforcing element in order to ensure the tensile strength of the hot-dip galvanized steel sheet of finally 980 MPa or more by adding Si, and optionally also C, to the steel. In addition, Mn is an element that stabilizes austenite and contributes to improvement of the formability of the steel sheet by generation of retained austenite. In order to allow such an effect to be effectively exhibited, the Mn content is preferably 1.5 mass % or more, more preferably 1.8 mass % or more, and still more preferably 2.0 mass % or more. However, when the Mn content is too large, ductility of the steel sheet is reduced, which adversely affects the formability of the steel sheet, and the weldability of the steel sheet may be reduced. From such a viewpoint, the Mn content is preferably 3.0 mass % or less, more preferably 2.8 mass % or less, and still more preferably 2.7 mass % or less.

[C: Preferably 0.08 Mass % or More and 0.30 Mass % or Less]

C is an element effective for improving the strength of the steel sheet, and is a particularly effective reinforcing element in order to ensure the tensile strength of the hot-dip galvanized steel sheet of finally 980 MPa or more by adding Si, and optionally also Mn, to the steel. Furthermore, C is an element necessary for securing retained austenite and improving the formability. In order to allow such an effect to be effectively exhibited, the C content is preferably 0.08 mass % or more, more preferably 0.11 mass % or more, and still more preferably 0.13 mass % or more. From the viewpoint of ensuring the strength of the steel sheet, it is preferable that the C content is large; however, when the C content is too large, corrosion resistance, spot weldability, and formability may deteriorate. Thus, the C content is preferably 0.30 mass % or less, more preferably 0.25 mass % or less, and still more preferably 0.20 mass % or less.

[P: Preferably More Than 0 Mass % and 0.1 Mass % or Less]

P is an element inevitably present as an impurity element. When the P content is excessive, the weldability of the steel sheet may be deteriorated. Thus, the P content is preferably 0.1 mass % or less, more preferably 0.08 mass % or less, and still more preferably 0.05 mass % or less.

[S: Preferably More Than 0 Mass % and 0.05 Mass % or Less]

S is an element inevitably present as an impurity element. Usually, steel inevitably contains S in an amount of about 0.0005 mass %. When the S content is excessive, a sulfide-based inclusion is formed, hydrogen absorption is promoted under a corrosive environment, delayed fracture resistance of the steel sheet is deteriorated, and the weldability and formability of the steel sheet may be deteriorated. Thus, the S content is preferably 0.05 mass % or less, more preferably 0.01 mass % or less, and still more preferably 0.005 mass % or less.

[Al: Preferably More Than 0 Mass % and 1.0 Mass % or Less]

Al is an element having a deoxidizing action. In order to allow such an effect to be effectively exhibited, the Al content is preferably more than 0 mass %, more preferably 0.005 mass % or more, and still more preferably 0.02 mass % or more. When the Al content is excessive, inclusions such as alumina increase, and the formability of the steel sheet may deteriorate. Thus, the Al content is preferably 1.0 mass % or less, more preferably 0.8 mass % or less, and still more preferably 0.5 mass % or less.

[Cr: Preferably More Than 0 Mass % and 1.0 Mass % or Less]

Cr is an element effective for improving the strength of the steel sheet. Furthermore, Cr is an element that improves the corrosion resistance of the steel sheet, and has an action of suppressing generation of hydrogen due to corrosion of the steel sheet. Specifically, Cr has an action of promoting the production of iron oxide ($\alpha$-FeOOH). Iron oxide is said to be thermodynamically stable and protective among rusts produced in the atmosphere. By promoting production of such rust, it is possible to suppress intrusion of generated hydrogen into the steel sheet, and it is possible to sufficiently suppress assisted cracking due to hydrogen even when the steel sheet is used under a severe corrosive environment, for example, in the presence of chloride. Since Cr is an element effective for the delayed fracture resistance of the steel sheet similarly to B and Ti, Cr can be added in an amount that does not affect formability such as the strength and elongation of the steel sheet. In order to allow these effects to be effectively exhibited, the Cr content is preferably more than 0 mass %, more preferably 0.003 mass % or more, and still more preferably 0.01 mass % or more. On the other hand, when the Cr content is excessive, formability such as the elongation of the steel sheet may deteriorate. Thus, the Cr content is preferably 1.0 mass % or less, more preferably 0.8 mass % or less, and still more preferably 0.6 mass % or less.

[Cu: Preferably More Than 0 Mass % and 1.0 Mass % or Less]

Similarly to Cr, Cu is an element that is effective for improving the strength of the steel sheet, has the action of suppressing generation of hydrogen due to corrosion of the steel sheet, and improves the corrosion resistance of the steel sheet. Cu also has an action of promoting the production of iron oxide, similarly to Cr. In order to allow these effects to be effectively exhibited, the Cu content is preferably more than 0 mass %, more preferably 0.003 mass % or more, and still more preferably 0.05 mass % or more. From the viewpoint of the formability of the steel sheet, the Cu content is preferably 1.0 mass % or less, more preferably 0.8 mass % or less, and still more preferably 0.5 mass % or less.

[Ni: Preferably More Than 0 Mass % and 1.0 Mass % or Less]

Similarly to Cr and Cu, Ni is an element that is effective for improving the strength of the steel sheet, has the action of suppressing generation of hydrogen due to corrosion of the steel sheet, and improves the corrosion resistance of the steel sheet. Ni also has the action of promoting the production of iron oxide, similarly to Cr and Cu. In order to allow these effects to be effectively exhibited, the Ni content is preferably more than 0 mass %, more preferably 0.003 mass % or more, and still more preferably 0.05 mass % or more. From the viewpoint of the formability of the steel sheet, the Ni content is preferably 1.0 mass % or less, more preferably 0.8 mass % or less, and still more preferably 0.5 mass % or less.

[Ti: Preferably More Than 0 Mass % and 0.15 Mass % or Less]

Similarly to Cr, Cu, and Ni, Ti is an element that is effective for improving the strength of the steel sheet, has the action of suppressing generation of hydrogen due to corrosion of the steel sheet, and improves the corrosion resistance of the steel sheet. Ti also has the action of promoting the production of iron oxide, similarly to Cr, Cu, and Ni. Since Ti is an element effective for the delayed fracture resistance of the steel sheet similarly to B and Cr, Ti can be added in an amount that does not affect formability such as the strength and elongation of the steel sheet. In order to allow these effects to be effectively exhibited, the Ti content is preferably more than 0 mass %, more preferably 0.003 mass % or more, and still more preferably 0.05 mass % or more. From the viewpoint of the formability of the steel sheet, the Ti content is preferably 0.15 mass % or less, more preferably 0.12 mass % or less, and still more preferably 0.10 mass % or less.

[Nb: Preferably More Than 0 Mass % and 0.15 Mass % or Less]

Nb is an element that is effective for improving the strength of the steel sheet, and acts on improving the toughness of the steel sheet by miniaturizing austenite grains after quenching. In order to allow such an effect to be effectively exhibited, the Nb content is preferably more than 0 mass %, more preferably 0.03 mass % or more, and still more preferably 0.005 mass % or more. On the other hand, when the Nb content is excessive, a large amount of carbide, nitride, or carbonitride is generated, and the formability or delayed fracture resistance of the steel sheet may deteriorate. Thus, the Nb content is preferably 0.15 mass % or less, more preferably 0.12 mass % or less, and still more preferably 0.10 mass % or less.

[V: Preferably More Than 0 Mass % and 0.15 Mass % or Less]

Similarly to Nb, V is an element that is effective for improving the strength of the steel sheet, and acts on improving the toughness of the steel sheet by miniaturizing austenite grains after quenching. In order to allow such an effect to be effectively exhibited, the V content is preferably more than 0 mass %, more preferably 0.03 mass % or more, and still more preferably 0.005 mass % or more. On the other hand, when the V content is excessive, similarly to Nb, a large amount of carbide, nitride, or carbonitride is generated, and the formability or delayed fracture resistance of the steel sheet may deteriorate. Thus, the V content is preferably 0.15 mass % or less, more preferably 0.12 mass % or less, and still more preferably 0.1 mass % or less.

[B: Preferably More Than 0 Mass % and 0.005 Mass % or Less]

B is an element useful for improving the hardenability and weldability of the steel sheet. Since B is an element effective for the delayed fracture resistance of the steel sheet similarly to Ti and Cr, B can be added in an amount that does not affect formability such as the strength and elongation of the steel sheet. In order to allow these effects to be effectively exhibited, the B content is preferably more than 0 mass %, more preferably 0.0002 mass % or more, still more preferably 0.0003 mass % or more, and particularly preferably 0.0004 mass % or more. On the other hand, when the B content is excessive, such an effect may be saturated, and the ductility may be reduced to deteriorate the formability. Thus, the B content is preferably 0.005 mass % or less, more preferably 0.004 mass % or less, and still more preferably 0.003 mass % or less.

[N: Preferably More Than 0 Mass % and 0.01 Mass % or Less]

N is an element inevitably present as an impurity element. When the N content is excessive, a nitride may be formed to deteriorate the formability of the steel sheet. In particular, when the steel sheet contains B for improving the hardenability, N bonds with B to form a BN precipitate, and inhibits the hardenability improving action of B. Thus, the N content is preferably 0.01 mass % or less, more preferably 0.008 mass % or less, and still more preferably 0.005 mass % or less.

In the chemical composition of the steel raw material in the present embodiment, in addition to the above components, other known optional components may be further contained as long as the strength and sufficient formability are not impaired.

[Balance]

The balance is Fe and inevitable impurities. It is permitted to mix, as inevitable impurities, trace elements (e.g., As, Sb, Sn, etc.) incorporated according to the conditions of raw materials, materials, manufacturing facilities and the like. P, S, and N as described above are usually preferred as the content is smaller, and thus can be said to be inevitable impurities. However, these elements are defined as described above since the present invention can exert its effect by suppressing the content thereof to a specific range. Thus, in the present specification, "inevitable impurities" constituting the balance mean the concept excluding elements whose composition range is defined.

Since the steel sheet for hot-dip galvanizing according to the present embodiment has a high Si content of 1 mass % or more, a high-strength and high-formability hot-dip galvanized steel sheet and a hot-dip galvannealed steel sheet can be manufactured at low cost, and the alloying unevenness can be suppressed in the coil width direction. More specifically, the hot-dip galvanized steel sheet and the hot-dip galvannealed steel sheet to be manufactured may have a tensile strength of 980 MPa or more.

In addition, as described above, when the hot-dip galvanized steel sheet and the hot-dip galvannealed steel sheet are manufactured, by continuously performing the oxidation treatment, the reduction treatment, the hot-dip galvanizing treatment, and the alloying treatment in a series of manufacturing lines using the continuous hot-dip galvanizing line, a high-strength and high-formability hot-dip galvannealed steel sheet without alloying unevenness can be manufactured more inexpensively and efficiently while product quality is maintained.

Although the overview of the present invention has been described above, the steel sheet for hot-dip galvanizing, the hot-dip galvanized steel sheet, and the hot-dip galvannealed steel sheet according to the embodiment of the present invention are summarized as follows.

A steel sheet for hot-dip galvanizing according to a first aspect of the present invention includes an internal oxide layer containing an oxide of Si between a surface layer of the steel sheet and a steel sheet base portion, an Si content in a chemical composition of the steel sheet is 1.0 mass % or more, and a solid solution Si amount from a surface of the steel sheet to a depth of 1 μm measured at all four positions including positions of 10 mm, 30 mm, and 50 mm from an edge in a coil width direction and a position of a center in the coil width direction at a rear end in a rolling direction of the steel sheet for hot-dip galvanizing is 1.4 wt % or less.

A hot-dip galvanized steel sheet according to a second aspect of the present invention includes a Zn-plated layer on a surface of the steel sheet for hot-dip galvanizing according to the first aspect.

A hot-dip galvannealed steel sheet according to a third aspect of the present invention includes an alloyed Zn-plated layer on a surface of the steel sheet for hot-dip galvanizing according to the first aspect.

EXAMPLES

Hereinafter, the present invention will be described more specifically with reference to examples, but the present invention is not limited by the examples at all.

Example 1

In Example 1, a steel sheet for hot-dip galvanizing as an example of the present invention was manufactured, and the solid solution Si amount at various positions in the manufactured steel sheet for hot-dip galvanizing was measured. In addition, the alloying unevenness in the manufactured steel sheet for hot-dip galvanizing was evaluated.

[Manufacturing of Steel Sheet for Hot-Dip Galvanizing]

A steel material of a steel grade A having a chemical composition shown in Table 1 below was produced by a converter, and then a slab was manufactured by continuous casting. The obtained slab was hot-rolled to a sheet thickness of 2.0 mm at a finish rolling end temperature of 900° C., and coiled at 640° C. as shown in Table 2 below, and the obtained hot-rolled steel sheet was cooled to normal temperature. Thereafter, the hot-rolled steel sheet was charged into an annealing furnace and annealed. As annealing conditions, in a non-reducing atmosphere of $N_2$-0.5 vol % $H_2$, the temperature of the hot-rolled steel sheet was increased to 580° C. for about 8.5 hours, soakingly retained at 580° C. for 30 hours, and then cooled to 200° C. or less for about 5 hours. Thereafter, the annealed steel sheet obtained was pickled by immersing the steel sheet at 85° C. for 40 seconds using hydrochloric acid having a concentration of 8 wt %. Finally, cold rolling was performed until the thickness of the annealed steel sheet was changed from 2.0 mm to 1.4 mm, and a steel sheet for hot-dip galvanizing was finally obtained.

[Measurement of Solid Solution Si Amount (wt %) in Test Piece of Steel Sheet for Hot-Dip Galvanizing]

The solid solution Si amount at various positions in the obtained steel sheet for hot-dip galvanizing was measured. Specifically, a test piece having a size of 20 mm×20 mm×1.4 mm (sheet thickness) was cut out by a shear cutter so as to include, at the center, the positions of 10 mm, 30 mm, 50 mm, and 70 mm from the edge in the coil width direction on one arbitrarily selected side at the rear end in the rolling direction of the steel sheet and the position of the center in the coil width direction. Thereafter, for each test piece, the solid solution Si amount (wt %) from the surface of the steel sheet to a depth of 1 μm, specifically, the average value (wt %) of the solid solution Si amount was measured. The solid solution Si amount of the steel sheet for hot-dip galvanizing was measured using a fully automatic scanning X-ray photoelectron spectrometer ("Quantera-SXM" manufactured by ULVAC-PHI, Incorporated). The measurement conditions were an X-ray output of 24.2 W, an X-ray beam diameter of 100 μm, and an analysis position of 1 μm in depth. Specifically, as shown in the following (Formula 1), a ratio of peak area intensity to {Si(SiO$_x$)+Si(Si—Si, Fe—Si)} of Si(Si—Si, Fe—Si) was determined, and the solid solution Si amount (wt %) was calculated by multiplying the actual Si content in steel. The calculated solid solution Si amount (wt %) in the steel sheet for hot-dip galvanizing is collectively shown in Table 2 below together with the manufacturing conditions of the steel sheet.

Solid solution Si amount(wt %)=[Si(Si—Si,Fe—Si)/{Si(SiO$_x$)+Si(Si—Si, Fe—Si)}]×Si content in steel     (Formula 1)

[Evaluation of Alloying Unevenness]

In order to evaluate alloying unevenness, a hot-dip galvannealed steel sheet was manufactured from the steel sheet for hot-dip galvanizing. The obtained steel sheet for hot-dip galvanizing was subjected to oxidation treatment, reduction treatment, hot-dip galvanizing treatment, and alloying treatment by applying the continuous galvanizing line having the NOF-type annealing furnace. In the oxidation treatment, the steel sheet was heated to a steel sheet temperature of about 710° C. (680° C. to 730° C.) in a temperature rise time of 45 seconds under a combustion exhaust gas atmosphere containing less than 17,000 ppm of $O_2$ and $CO_2$, $N_2$, and $H_2O$. Here, the "steel sheet temperature" means the maximum reached sheet temperature of the steel sheet whose heating is controlled in the oxidation heating zone of the NOF-type (or DFF-type in Examples 3 and 4 described later) annealing furnace. The reduction treatment was performed by heating at a soaking temperature of about 800° C. (770° C. to 820° C.) for 50 seconds under a gas atmosphere of $N_2$—$H_2$. In the hot-dip galvanizing treatment, the steel sheet after reduction was immersed in the Zn-plating bath at 430° C. to form a hot-dip galvanizing layer. The hot-dip galvanized steel sheet was thus obtained, and then a hot-dip galvannealed steel sheet was obtained by alloying treatment.

When an appearance of the obtained hot-dip galvannealed steel sheet was visually observed, Zn—Fe alloying proceeded, and metallic luster of Zn disappeared, the alloying unevenness of the hot-dip galvannealed steel sheet was evaluated as "○". On the other hand, a case where the metallic luster of Zn remained was evaluated as "×".

Example 2

In Example 2, a steel sheet for hot-dip galvanizing and a hot-dip galvannealed steel sheet were manufactured by the same method as in Example 1 described above except that a steel material having a chemical composition of a steel grade B shown in Table 1 below was used and the coiling temperature in hot rolling was set to 550° C. In addition, the solid solution Si amount in the steel sheet for hot-dip galvanizing was also calculated by the same method, and the alloying unevenness was also evaluated in the same manner. The evaluation results of the solid solution Si amount and alloying unevenness in the steel sheet for hot-dip galvanizing of Example 2 are collectively shown in Table 2 below together with the manufacturing conditions of the steel sheet.

Example 3

In Example 3, a steel sheet for hot-dip galvanizing and a hot-dip galvannealed steel sheet were manufactured by the same method as in Example 1 described above except that a steel material having a chemical composition of a steel grade C shown in Table 1 below was used, the coiling temperature in hot rolling was set to 660° C., the continuous hot-dip galvanizing line having the DFF-type annealing furnace was applied, the oxidation treatment, the reduction treatment, the hot-dip galvanizing treatment, and the alloying treatment were performed, the soaking temperature in the reduction treatment was set to about 900° C. (900° C. to 950° C.), and the soaking time was set to about 300 seconds (240 seconds to 360 seconds).

Subsequently, a test piece including the same respective positions as in Example 1 described above was cut out from the obtained steel sheet for hot-dip galvanizing. Thereafter, an amount of the internal oxide layer of each test piece was calculated. The internal oxide layer amount of the test piece can be determined, for example, by immersing the test piece under the condition of a temperature of 80° C. using hydrochloric acid having a concentration of 10 mass % and measuring an amount of dissolution per unit area. In a graph of FIG. 2, an example of a distribution of the internal oxide layer amount in the coil width direction obtained by such a method is schematically shown. In general, if the conditions of hot rolling and the annealing conditions before pickling are the same, it is assumed that the distribution of the internal oxide layer amount shows a similar tendency regardless of the steel grade. In the steel sheet of Example 3, a tendency of the distribution of the internal oxide layer amount similar to the distribution shown in FIG. 2, specifically, a tendency that the test piece at a position of 10 mm from the edge in the coil width direction had the smallest internal oxide layer amount was shown. In a graph of FIG. 3, an example of a correlation between the solid solution Si amount and the internal oxide layer amount of the steel sheet is schematically shown. The graph of FIG. 3 can be obtained by measuring the solid solution Si amount and the internal oxide layer amount of each test piece. In general, regardless of the steel grade, the conditions of hot rolling, and the annealing conditions before pickling, as shown in the graph of FIG. 3, when the internal oxide layer amount is smaller, the solid solution Si amount tends to be larger.

Figure 2:
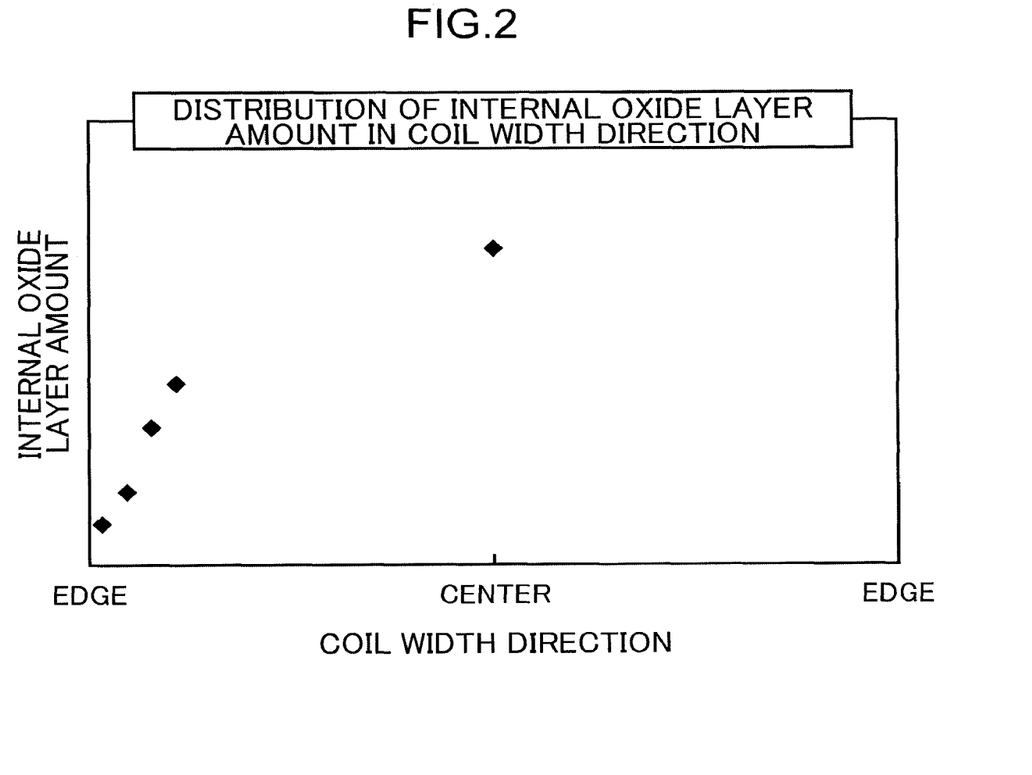
FIG. 2 is a graph schematically showing an example of a distribution of an amount of an internal oxide layer in a coil width direction.
Figure 3:
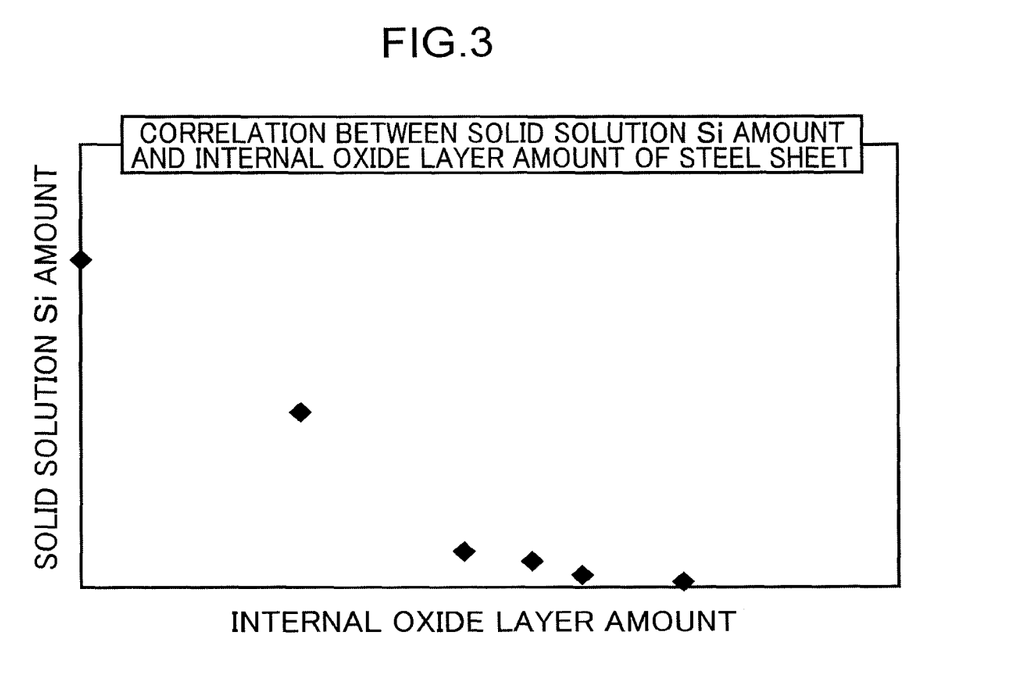
FIG. 3 is a graph schematically showing an example of a correlation between a solid solution Si amount and the internal oxide layer amount of the steel sheet.

From FIGS. 2 and 3, it can be seen that a position in the coil width direction where the solid solution Si amount (wt %) is the largest in Example 3 is a position of 10 mm from the edge in the coil width direction where the internal oxide layer amount is the smallest. Therefore, in Example 3, the solid solution Si amount of only the test piece at the position of 10 mm from the edge in the coil width direction of the steel sheet for hot-dip galvanizing was calculated by the same method as described above. In addition, the alloying unevenness of the test piece was also evaluated in the same manner. The evaluation results of the solid solution Si amount and alloying unevenness in the steel sheet for hot-dip galvanizing of Example 3 are collectively shown in Table 2 below together with the manufacturing conditions of the steel sheet.

Example 4

In Example 4, a steel sheet for hot-dip galvanizing and a hot-dip galvannealed steel sheet were manufactured by the same method as in Example 3 described above except that a steel material having a chemical composition of a steel grade D shown in Table 1 below was used, the steel sheet was hot-rolled so as to have a sheet thickness of 2.3 mm, and the steel sheet after annealing was cold-rolled so that the sheet thickness was changed from 2.3 mm to 1.4 mm.

In addition, the internal oxide layer amount of the test piece including each position of the steel sheet for hot-dip galvanizing was calculated in the same manner as in Example 3 described above. In the steel sheet of Example 4, a tendency of the distribution of the internal oxide layer amount almost the same as the distribution shown in FIG. 2, specifically, a tendency that the test piece at the position of 10 mm from the edge in the coil width direction had the smallest internal oxide layer amount was shown. Therefore, based on FIGS. 2 and 3, it can be seen that also in the steel sheet in Example 4, the position in the coil width direction where the solid solution Si amount (wt %) is the largest is a position of 10 mm from the edge in the coil width direction. Thus, also in Example 4, the solid solution Si amount of only the test piece at the position of 10 mm from the edge in the coil width direction of the steel sheet for hot-dip galvanizing was calculated by the same method as described above. In addition, the alloying unevenness of the test piece was also evaluated in the same manner. The evaluation results of the solid solution Si amount and alloying unevenness in the steel sheet for hot-dip galvanizing of Example 4 are collectively shown in Table 2 below together with the manufacturing conditions of the steel sheet.

Comparative Example 1

In Comparative Example 1, a steel sheet for hot-dip galvanizing and a hot-dip galvannealed steel sheet were manufactured by the same method as in Example 1 described above except that the coiling temperature in hot rolling was set to 660° C., and annealing before pickling was not performed. In addition, the solid solution Si amount in the steel sheet for hot-dip galvanizing was also calculated by the same method, and the alloying unevenness was also evaluated in the same manner. The evaluation results of the solid solution Si amount and alloying unevenness in the steel sheet for hot-dip galvanizing of Comparative Example 1 are collectively shown in Table 2 below together with the manufacturing conditions of the steel sheet.

TABLE 1

| Steel | Chemical composition (wt %) | | | | | | |
|---|---|---|---|---|---|---|---|
| grade | Si | Mn | C | P | S | Al | Cr |
| A | 1.83 | 2.00 | 0.22 | 0.009 | 0.0005 | 0.05 | 0.20 |
| B | 1.87 | 2.01 | 0.22 | 0.010 | 0.0005 | 0.04 | 0.19 |
| C | 1.41 | 2.03 | 0.22 | 0.009 | 0.0008 | 0.04 | 0.52 |
| D | 1.60 | 2.19 | 0.21 | 0.007 | 0.0005 | 0.44 | 0.03 |

TABLE 2

| Category | Steel grade | Test piece collection position (Position of rear end (0 mm) in rolling direction) | Solid solution Si amount (wt %) | Alloying unevenness Presence: X Absence: ○ | Hot rolling coiling temperature (° C.) | Annealing condition (Soaking temperature × soaking time) |
|---|---|---|---|---|---|---|
| Example 1 | Present invention example | A | Position of 10 mm from edge in coil width direction | 0.99 | ○ | 640 | 580° C. × 30 hours |
| | | | Position of 30 mm from edge in coil width direction | 0.15 | ○ | | |
| | | | Position of 50 mm from edge in coil width direction | 0.20 | ○ | | |
| | | | Position of 70 mm from edge in coil width direction | 0.07 | ○ | | |
| | | | Position of center in coil width direction | 0.03 | ○ | | |
| Example 2 | Present invention example | B | Position of 10 mm from edge in coil width direction | 0.28 | ○ | 550 | 580° C. × 30 hours |
| | | | Position of 30 mm from edge in coil width direction | 0.39 | ○ | | |
| | | | Position of 50 mm from edge in coil width direction | 0.72 | ○ | | |
| | | | Position of 70 mm from edge in coil width direction | 0.26 | ○ | | |
| | | | Position of center in coil width direction | 0.49 | ○ | | |
| Example 3 | Present invention example | C | Position of 10 mm from edge in coil width direction | 0.16 | ○ | 660 | 580° C. × 30 hours |
| Example 4 | Present invention example | D | Position of 10 mm from edge in coil width direction | 0.14 | ○ | 660 | 580° C. × 30 hours |
| Comparative Example 1 | Comparative Example | A | Position of 10 mm from edge in coil width direction | 1.64 | X | 660 | No annealing |
| | | | Position of 30 mm from edge in coil width direction | 1.66 | X | | |
| | | | Position of 50 mm from edge in coil width direction | 1.36 | ○ | | |
| | | | Position of 70 mm from edge in coil width direction | 0.59 | ○ | | |

Consideration

As shown in Table 2 above, in the steel sheet for hot-dip galvanizing of Example 1, the solid solution Si amount satisfied 1.4 wt % or less as defined in the present embodiment at any position including a position of 10 mm from the edge in the coil width direction where the solid solution Si amount was the largest, and no alloying unevenness occurred. In the steel sheet for hot-dip galvanizing of Example 2, the coiling temperature in hot rolling was lower than that in Example 1, and the internal oxide layer hardly grew under the manufacturing conditions; however, the solid solution Si amount satisfied 1.4 wt % or less as specified in the present embodiment at any position, and no alloying unevenness occurred. In the steel sheet for hot-dip galvanizing of Example 2, unlike the steel sheets of other Examples, not the test piece at the position of 10 mm from the edge in the coil width direction, but the test piece at the position of 50 mm from the edge in the coil width direction had the largest solid solution Si amount. It is assumed that this was affected by the fact that the coiling temperature in hot rolling was significantly lower than that in other Examples. In addition, in the steel sheet for hot-dip galvanizing of Examples 3 and 4, as described above, the solid solution Si amount of the test piece at the position of 10 mm from the edge in the coil width direction where the solid solution Si amount (wt %) was assumed to be the largest satisfied 1.4 wt % or less as defined in the present embodiment, and no alloying unevenness occurred. This was considered to be because annealing was performed before pickling as in Example 1. From the result of the alloying unevenness, it is assumed that the steel sheets for hot-dip galvanizing of Examples 1, 2, 3 and 4 have the internal oxide layer containing an oxide of Si between the surface layer of the steel sheet and the steel sheet base portion in the vicinity of the edge in the coil width direction.

On the other hand, in the steel sheet for hot-dip galvanizing of Comparative Example 1 (conventional material), the solid solution Si amount satisfied a prescribed amount of 1.4 wt % or less up to the position of 50 mm from the edge in the coil width direction, and no alloying unevenness occurred. However, at a position where the solid solution Si amount at a position closer to the edge in the coil width direction did not satisfy the prescribed amount of 1.4 wt % or less, alloying unevenness occurred, and alloying could not be uniformly performed in the coil width direction. That is, it is considered that even if the coiling temperature in hot rolling is increased, unless annealing is performed before pickling, the internal oxide layer is not completely formed in the vicinity of the edge in the coil width direction, and the solid solution Si amount close to the surface of the steel sheet is increased by pickling in the subsequent step, which finally leads to alloying unevenness.

In addition, from these results, it can be seen that in the steel sheet for hot-dip galvanizing having a high Si content, when the solid solution Si amount from the surface of the steel sheet to a depth of 1 µm calculated from (Formula 1) described above is 1.4 wt % or less by suitably controlling the coiling temperature in the hot rolling at the time of manufacturing the steel sheet, the annealing conditions before pickling, and the pickling conditions, a hot-dip galvannealed steel sheet without alloying unevenness is obtained.

The present application is based on Japanese Patent Application No. 2021-036227 filed on Mar. 8, 2021 and Japanese Patent Application No. 2022-014413 filed on Feb. 1, 2022, the contents of which are incorporated herein.

It should be understood that the embodiments and examples disclosed herein are exemplary in all respects and do not pose any limitation. The scope of the present invention is indicated by the scope of claims instead of the above description, and is intended to include meanings equivalent to the scope of claims and all modifications within the scope.

INDUSTRIAL APPLICABILITY

According to the present invention, a substrate capable of manufacturing a hot-dip galvannealed steel sheet in which alloying unevenness is suppressed even when the Si content is large, specifically, a steel sheet for hot-dip galvanizing can be obtained. Thus, for example, it is possible to efficiently manufacture a high-strength and high-formabilityformability hot-dip galvanized steel sheet and a hot-dip galvannealed steel sheet having a tensile strength of 980 MPa or more, which are suitably applied to an automobile member such as an automobile body.

The invention claimed is:

1. A steel sheet suitable for hot-dip galvanizing, the steel sheet comprising:
   an internal oxide layer comprising an oxide of Si between a surface layer of the steel sheet and a steel sheet base portion,
   wherein a steel of the steel sheet comprises Si in 1.0 mass % or more,
   wherein a solid solution Si amount from the surface of the steel sheet to a depth of 1 µm, measured at all four positions including positions of 10 mm, 30 mm, and 50 mm from an edge in a coil width direction and a position of a center in the coil width direction at a rear end in a rolling direction of the steel sheet, is 1.4 wt % or less, and
   wherein the solid solution Si amount is highest at any one of the positions of 10 mm, 30 mm, and 50 mm from the edge in the coil width direction.

2. A hot-dip galvanized steel sheet, comprising:
   the steel sheet of claim 1; and
   a Zn-plated layer on the surface of the steel sheet.

3. A hot-dip galvannealed steel sheet, comprising:
   the steel sheet of claim 1; and
   an alloyed Zn-plated layer on the surface of the steel sheet.

4. The steel sheet of claim 1, having a tensile strength of 980 MPa or more.

5. The steel sheet of claim 1, wherein the solid solution Si amount is 1.36 wt % or less.

6. The steel sheet of claim 1, wherein the solid solution Si amount is 1.32 wt % or less.

7. The steel sheet of claim 1, wherein the solid solution Si amount is 1.30 wt % or less.

8. The steel sheet of claim 1, wherein the steel comprises Si in a range of from 1.0 to 3.0 mass %.

9. The steel sheet of claim 1, wherein the steel comprises Si in a range of from 1.1 to 2.7 mass %.

10. The steel sheet of claim 1, wherein the steel comprises Si in a range of from 1.2 to 2.5 mass %.

11. The steel sheet of claim 1, wherein the steel thereofcomprises Mn in a range of from 1.5 to 3.0 mass %.

12. The steel sheet of claim 1, wherein the steel comprises Mn in a range of from 1.8 to 2.8 mass %.

13. The steel sheet of claim 1, wherein the steel comprises Mn in a range of from 2.0 to 2.7 mass %.

14. The steel sheet of claim 1, wherein the steel comprises C in a range of from 0.08 to 0.30 mass %.

15. The steel sheet of claim 1, wherein the steel comprises C in a range of from 0.11 to 0.25 mass %.

16. The steel sheet of claim 1, wherein the steel comprises C in a range of from 0.13 to 0.20 mass %.

17. The steel sheet of claim 1, wherein the steel comprises
   P in a range of from more than 0 to 0.1 mass %,
   S in a range of from more than 0 to 0.05 mass %,
   Al in a range of from more than 0 to 1.0 mass %,
   Cr in a range of from more than 0 to 1.0 mass %,
   Cu in a range of from more than 0 to 1.0 mass %,
   Ni in a range of from more than 0 to 1.0 mass %,
   Ti in a range of from more than 0 to 0.15 mass %,
   Nb in a range of from more than 0 to 0.15 mass %,
   V in a range of from more than 0 to 0.15 mass %,
   B in a range of from more than 0 to 0.005 mass %, and/or
   N in a range of from more than 0 to 0.01 mass %.

18. The steel sheet of claim 1, wherein the solid solution Si amount is in a range of from 0.03 to 1.4 wt. %.

19. The steel sheet of claim 1, wherein the solid solution Si amount, measured at the position of 10 mm from the edge in the coil width direction, is in a range of from 0.14 to 0.99 wt. %.

20. The steel sheet of claim 1, wherein the solid solution Si amount is in a range of from 0.03 to 1.36 wt. %.

* * * * *